(12) United States Patent
Moore (10) Patent No.: US 7,743,241 B1
(45) Date of Patent: Jun. 22, 2010

(54) SECURING THE CONTENTS OF DATA STORAGE DEVICES WITHIN A COMPUTER

(75) Inventor: Kevin Moore, Round Rock, TX (US)

(73) Assignee: American Megatrends, Inc., Norcross, GA (US)

(*) Notice: Subject to any disclaimer, the term of this patent is extended or adjusted under 35 U.S.C. 154(b) by 1095 days.

(21) Appl. No.: 10/660,981

(22) Filed: Sep. 12, 2003

(51) Int. Cl.
*G06F 9/00* (2006.01)
*H04L 29/06* (2006.01)
*G06F 1/00* (2006.01)

(52) U.S. Cl. .......................... 713/2; 713/161; 713/300

(58) Field of Classification Search ................. 713/161, 713/2, 183, 300; 726/5–29, 34
See application file for complete search history.

(56) References Cited

U.S. PATENT DOCUMENTS

| | | | | |
|---|---|---|---|---|
| 5,375,243 A | * | 12/1994 | Parzych et al. | 726/17 |
| 5,537,544 A | * | 7/1996 | Morisawa et al. | 726/19 |
| 5,983,349 A | * | 11/1999 | Kodama et al. | 726/19 |
| 6,032,256 A | * | 2/2000 | Bernard | 726/34 |
| 6,105,136 A | * | 8/2000 | Cromer et al. | 726/34 |
| 6,145,085 A | * | 11/2000 | Tran et al. | 726/5 |
| 6,397,337 B1 | * | 5/2002 | Garrett et al. | 726/19 |
| 6,725,382 B1 | * | 4/2004 | Thompson et al. | 726/19 |
| 7,100,036 B2 | * | 8/2006 | Schwartz | 713/2 |
| 7,103,909 B1 | * | 9/2006 | Kondo et al. | 726/2 |

* cited by examiner

*Primary Examiner*—Nasser Moazzami
*Assistant Examiner*—Mohammad W Reza
(74) *Attorney, Agent, or Firm*—Hope Baldauff Hartman, LLC (57) ABSTRACT

Each data storage device that supports the standard security features and is enabled with a security password may be locked when power is removed from the device. When power is returned, a determination is made as to whether the data storage device is locked and returning from a powered off state or a hardware reset. If locked, a password may be received from a user. After the security password is received, the data storage device is unlocked, allowing access to the data on the device. A setup utility is provided for manipulating the security and backup passwords for each device. Other features include: presenting locked devices to the operating system, the use of a backup password to unlock a device in lieu of the security password, requiring or not requiring password entry from a user to unlock a device when returning from a sleep state, setting maximum or high security, an automatic hardware reset upon exiting the setup utility, and disabling change password capabilities for devices without an enabled security password.

11 Claims, 9 Drawing Sheets

SECURING THE CONTENTS OF DATA STORAGE DEVICES WITHIN A COMPUTER

TECHNICAL FIELD

Embodiments of the invention relate generally to the field of computer system security. More particularly, embodiments of the invention relate to the field of securing the contents of data storage devices within a computer.

BACKGROUND OF THE INVENTION

Many personal, server, and notebook computer users see the hard disk as the most important and valuable part of their computer. This is especially true if the users have never made a data backup and their hard disk contains all of their work for an extended period of time. Hard disks are utilized to store important and confidential information and are often not secured sufficiently to prevent access to valuable data if the disk is stolen and/or removed from its original computer environment.

Unlike desktop and server computers, notebook computers are more susceptible to theft. Once taken, the hard disk drive unit may be removed from the stolen computer and installed in a different computer, thereby granting unauthorized access to confidential and valuable data. Similarly, because server computers accumulate and store valuable information for the client base served, unauthorized access by hackers or some other means could be disastrous for a business or non-profit entity that depend on the confidential nature of their data to operate.

Unauthorized access may be prevented on drives equipped with a security mode feature set that supports restriction of access to the data on the hard drive. Protocols for the security mode feature set or security features are generally described in the 1321D AT Attachment-5 with Packet Interface ("ATA/ATAPI-5") specification. However, some users prefer different ways of implementing the specification based on their security needs. For instance, some customers or consumers may desire limited access to a locked drive during runtime whereas others desire a complete isolation of access to a locked drive. As another example, customers may desire to use various password features depending on the nature of the data stored on the hard drive. For instance, some customers may desire automatic password retrieval when returning from a sleep state, whereas others may desire a manual input of the password every time the drive loses power.

It is with respect to these considerations and others that the various embodiments of the present invention have been made.

SUMMARY OF THE INVENTION

In accordance with the present invention, the above and other problems are solved by methods and systems for securing the contents of data storage devices within a computer. These systems and methods secure the contents of data storage devices, including disk drives, that support standardized security features within a computer. The security features include standard commands such as security unlock, set password, disable password, freeze lock, erase prepare, and erase. Each data storage device may also be locked upon the powering off, hard reset, or sleep state of the device.

Security is implemented for each data storage device by determining whether the data storage device supports the security features. If the security features are supported, a determination is made as to whether the data storage device is locked and returning from a powered off state or a hardware reset. Next, in response to the data storage device being locked and returning from a powered off state or hardware reset, a password is received from a user. Each data storage device may have a unique security password stored on the firmware of the device. If the received password matches the security password, the data storage device is opened or unlocked thereby allowing access to the data stored on the device. This security implementation may occur during a power on test procedure, such as power on self test ("POST"), executing on the computer hosting the data storage devices.

In accordance with other aspects, a maximum number of security password entry attempts are allowed for unlocking a data storage device. If the entry is invalid, a determination is made as to whether the entry attempts have expired. If not, an entry attempt counter is decremented by one and another password entry for the security password is received. If the entry attempts expire, a message that the data storage device remains locked is displayed and additional entries may be prohibited until another power cycle. In contrast, if a security password match occurs before the entry attempts expire, the data storage device is unlocked for access. Unlocked data storage devices are then presented to an operating system.

An optional feature is included for data storage devices that remain locked where locked data storage devices are also presented to the operating system. In this case, a limited number of commands may still be executed on the locked device. However, reading from or writing to the locked device is still prohibited. For instance, an operating system may be loaded from a separate unlocked device. Subsequently, the locked device presented to the operating system may be unlocked with the password at another time without having to cycle power to gain access to the drive. If this optional feature is not operative, the locked devices are isolated from the operating system.

In accordance with other aspects, another optional feature includes requiring a user to enter a password to unlock a device when the device is returning from a sleep state. If password entry from a user is not required, the security password is stored in memory located outside the data storage device when a security password entry occurs during a power on test procedure. The security password may be stored in an encrypted format. Once the security password is stored in memory, formerly unlocked devices, returning from a sleep state in a locked condition, are unlocked with the stored security password without requiring the user to enter a password.

In accordance with other aspects, an operating system independent security setup utility is provided for manipulating a security password for each data storage device that supports the security features. If a security password has been set for the data storage device, the setup utility may require entry of the security password prior to permitting access to the utility functions. In the alternative, entry of a password to access the utility functions may not be required, thereby only requiring that the device to be unlocked to access the utility functions.

Additional features include the use of a backup password that may be set by an original equipment manufacturer or the user. The backup password is also known as the master password. The backup password is operative to unlock a data storage device in lieu of the security or user password. This optional feature may be presented to the user during a power on test procedure, permitting the user to enter the security password or backup password to unlock the device. Another feature is the setting of maximum or high security. If maximum security is set, the data storage device is erased upon the entry of a backup password. High security will permit the backup password to unlock the device without erasing the data storage device.

Another feature includes an automatic hardware reset upon exiting the setup utility. This feature eliminates the necessity to cycle power on the data storage device to lock the devices with the new or changed security and backup passwords enabled during the setup utility session. Another feature provides measures to prevent changes to passwords during runtime by disabling the set password capabilities for devices that are unlocked and do not have an enabled security password. This feature helps to counter virus attacks that attempt to set a password on devices that are not enabled with a security password.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

As described briefly above, embodiments of the present invention provide methods and systems for securing the contents of data storage devices within a computer. In the following detailed description, references are made to accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Figure 1:
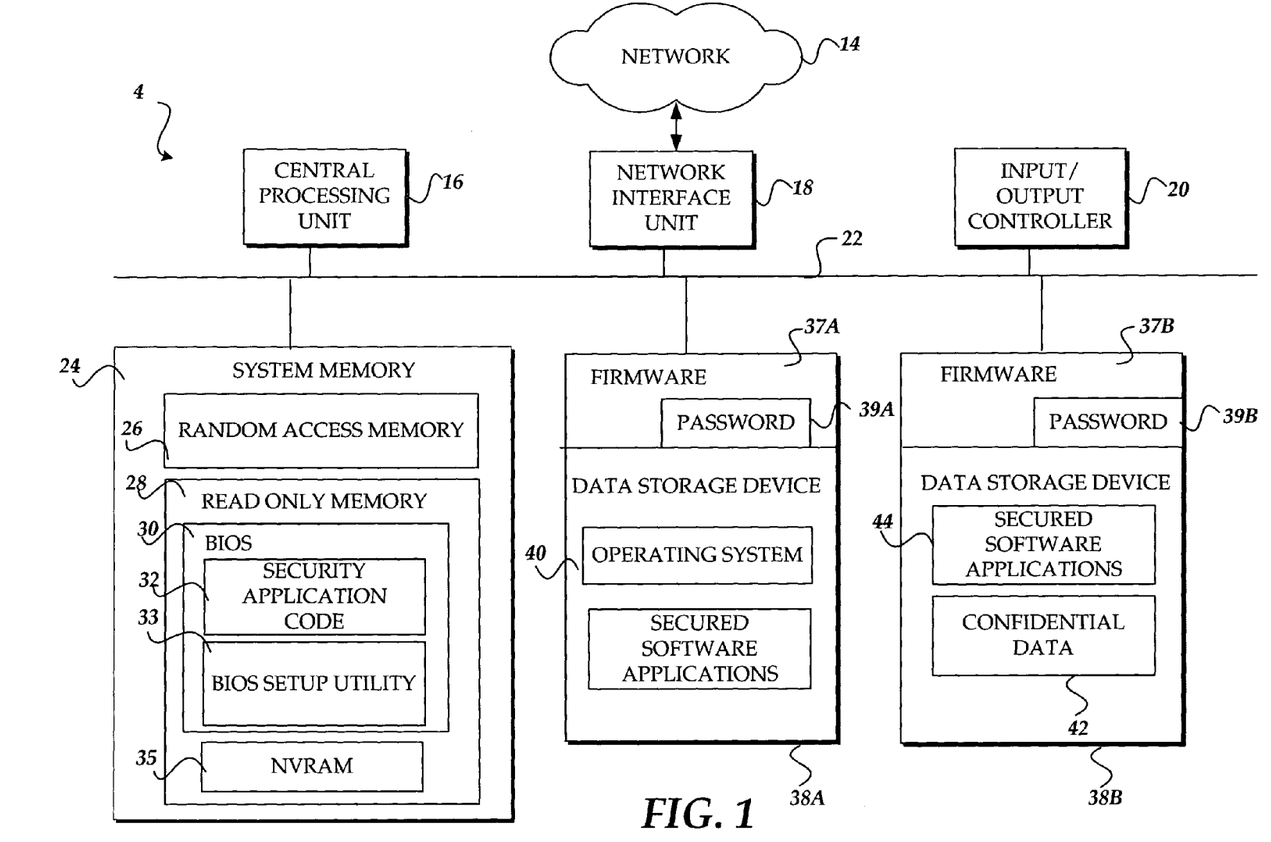
FIG. 1 illustrates a computer and memory architecture for a computer system utilized in the various embodiments of the invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the embodiments of the invention may be implemented. While the invention will be described in the general context of program modules that execute in conjunction with a BIOS program that executes on a personal or server computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 4 for practicing the various embodiments of the invention will be described. The computer architecture shown in FIG. 1 illustrates a conventional server, personal, or notebook computer 4, including a central processing unit 16 ("CPU"), a system memory 24, including a random access memory 26 ("RAM") and a read-only memory ("ROM") 28, and a system bus 22 that couples the memory to the CPU 16. A basic input/output system ("BIOS") 30 containing the basic routines that help to transfer information between elements within the computer, such as during startup, is stored in the ROM 28 along with a non-volatile memory 35. The BIOS 30 also provides functionality for securing the contents of data storage devices within a computer 4. As will be described in greater detail below, the security application code 32 may be stored in the BIOS 30 along with the BIOS setup utility 33 which includes security functions for manipulating security and backup passwords. Additional details regarding the operation of the BIOS 30 in this regard will be described below with respect to FIGS. 2A-4D.

The computer 4 further includes one or more data storage devices such as 38A and 38B for storing an operating system 40 suitable for controlling the operation of a networked computer, such as the WINDOWS NT or XP operating systems from MICROSOFT CORPORATION of Redmond, Wash. The operating system 40 is loaded onto the system memory 24 for use during runtime and will be hindered from loading unless the data storage device 38A is unlocked. The data storage devices 38A/38B may also store application programs and data, some of which may be of a confidential or secured nature. For instance, the data storage devices may store programs such as the secured software application 44 and data such as the confidential data 42, both of which may motivate a user to keep the data storage devices locked when not in use. Security passwords 39A and 39B, enabled from the setup utility 33, are stored in the firmware 37A and 37B of the data storage devices 38A and 38B respectively. Each data storage device may have a unique security password 39A/39B. As an option, the data storage device may also have a backup password (not shown) stored in the firmware 37A/37B, along with the security password. Both passwords are operative to unlock the device, however the backup password is limited in scope. Additional details regarding the backup password option will be described below with respect to FIGS. 2A-4D.

The data storage devices 38A/38B are connected to the CPU 16 through a mass storage controller (not shown) connected to the bus 22. The data storage devices 38A/38B and their associated computer-readable media, provide non-volatile storage for the computer 4. Although the description of computer-readable media contained herein refers to a data storage device such as a hard disk or CD-ROM drive, it should be appreciated by those skilled in the art that computer-readable media can be any available media that can be accessed by the computer 4.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 4 may operate in a networked environment using logical connections to remote computers through a network 14, such as the Internet or a LAN. The computer 4 may connect to the network 14 through a network interface unit 18 connected to the bus 22. It should be appreciated that the network interface unit 18 may also be utilized to connect to other types of networks and remote computer systems. The computer 4 may also include an input/output controller 20 for receiving and processing input from a number of devices, including a keyboard, mouse, or electronic stylus (not shown in FIG. 1). Similarly, an input/output controller 20 may provide output to a display screen, a printer, or other type of output device.

Figure 2A:
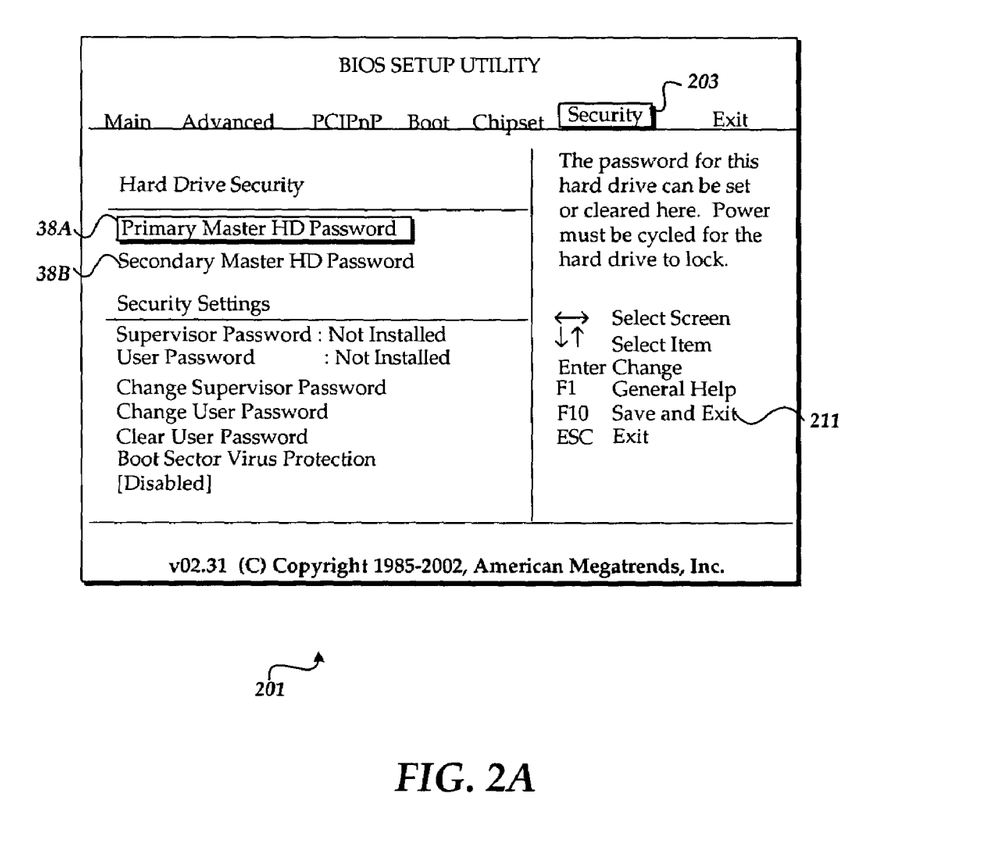
FIGS. 2A-2C illustrate a display and operational flow for a security setup utility utilized in the various embodiments of the invention.
Figure 2B:
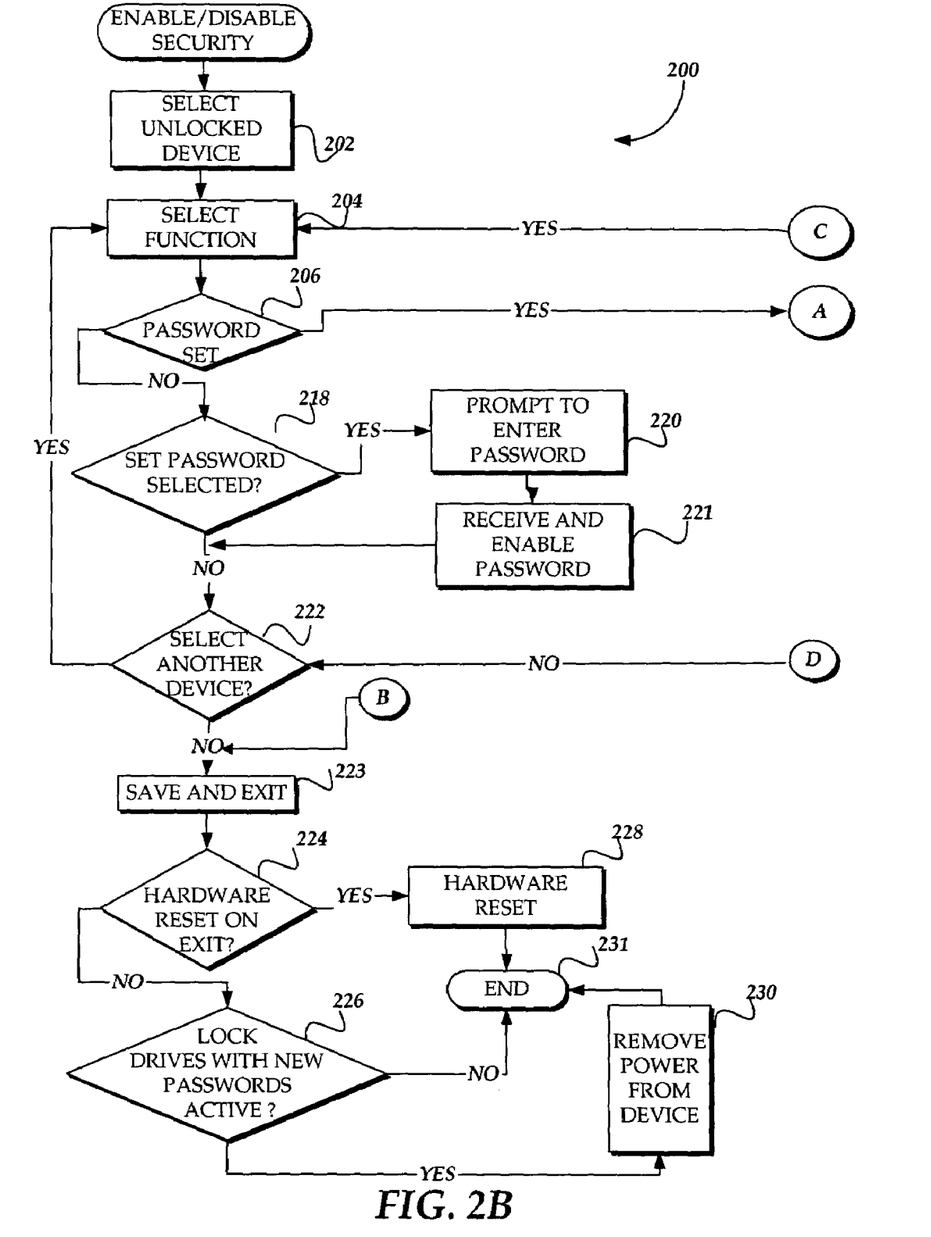
Figure 2C:
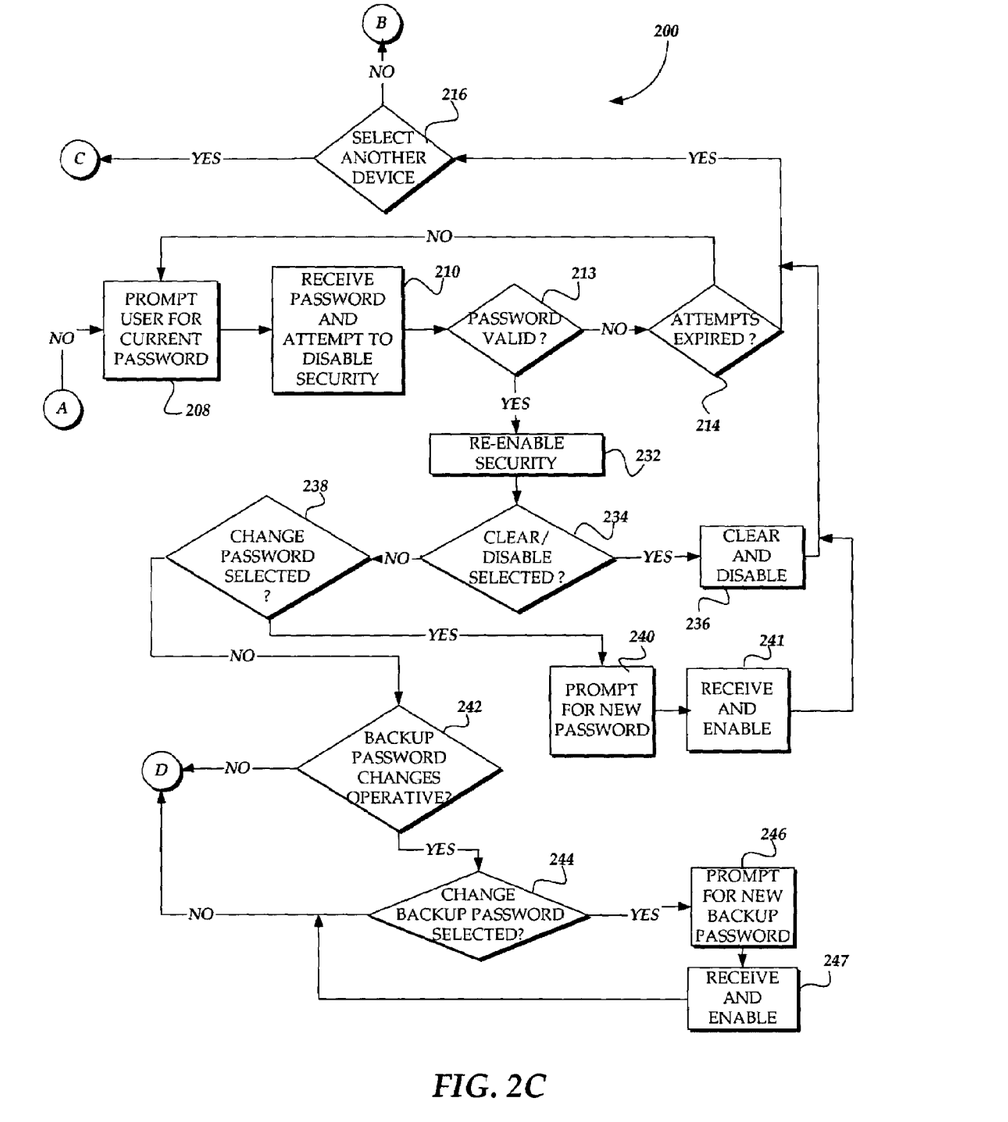

Turning now to FIGS. 2A-2C, a display and operational flow for security setup functionality within the setup utility 33 utilized in the various embodiments of the invention will be described. The BIOS 30 is stored within the ROM 28. Stored within the BIOS 30, among other items, is the BIOS setup utility 33 and the security application code 32. Within the BIOS setup utility 33, are security functions operative to manipulate security and backup passwords in order to establish or disable a password set condition within the data storage devices 38A/38B. The data storage devices 38A/38B remain unlocked until passwords are enabled through the setup utility 33.

Beginning with FIG. 2A, a display 201 from the setup utility 33 will be described. The security menu selection 203 represents the security function selections of the BIOS setup utility 33. The devices 38A/38B represent the data storage devices that may be selected for password security manipulation. Once the device 38A or 38B has been selected, the security password for the selected drive may be set, changed, or disabled. In FIG. 2A, the device 38A has been selected in the display 201. The security password 39A authorizes the security setup manipulation for the device 38A.

Backup passwords may be changed for the selected drive from the setup utility 33. Backup passwords may be used to unlock the data storage devices 38A/38B in lieu of the security password. However, the backup passwords are limited, in that they do not authorize security setup functionality. For example, backup passwords will not authorize a change in the security password or the disabling of security once a security password has been set. Furthermore, if backup passwords are supported, they are usually set or enabled prior to the security password in order to prevent unauthorized changes to the backup password once it has been set. This may be accomplished by a backup password entry prompt displayed to the user during BIOS setup. In the alternative this option may be removed and the OEM may set the backup password without giving the user an option to change the backup password. In this case the backup password may be loaded and stored on the firmware 37A/37B when the user is in the BIOS setup utility 33, just before the user password is set.

Once the security password 39A has been set or enabled, the data storage device 38A may be locked with the security password 39A by cycling or removing the power on the device 38A subsequent to exiting the setup utility 33 via the save and exit selection 211. In the alternative, a hardware reset may be initiated after the save and exit 211, thereby removing power to and locking the data storage device 38A.

Turning now to FIG. 2B, an operational flow of a security setup utility 33 in an embodiment of the present invention will be described. The routine 200 begins at operation 202 where an unlocked data storage device 38A is selected for security password manipulation. Passwords may be set, changed or disabled within the routine 200. If a data storage device is still locked when entering the setup utility 33, changes to the security setup for the locked device are prohibited until the device is unlocked. Next the routine 200 continues from operation 202 to operation 204 where a security function of the setup utility 33 is selected. Next the routine 200 continues to operation 206 where a determination is made as to whether a security password has been set for the device. If a security password has not been set or enabled, the routine 200 continues to operation 218 where a determination is made as to whether the set password function (not shown) has been selected.

If the set security password function has not been selected, the routine 200 continues from operation 218 to operation 222 described below. If the change security password function has been selected, the routine 200 continues to operation 220. Operation 220 prompts the user for a security password 39A and upon entry of the security password the routine 200 continues to operation 221. Operation 221 receives and enables the security password 39A. Password enabling is accomplished by writing the security password 39A to the firmware 37A of the data storage device 38A. Next the routine 200 continues to operation 222 where a determination is made as to whether another device has been selected for password security manipulation. If another device has been selected the routine 200 returns to operation 204 described above.

If another device has not been selected, the routine 200 continues to operation 223 where the current status of the security setup utility is saved and an exit from the utility takes place. Next the routine 200 continues to operation 224 where a determination is made as to whether a hardware reset occurs upon exiting the setup utility. If the hardware reset occurs the routine 200 continues to operation 228 where a hardware reset occurs, upon which the data storage devices 38A/38B are locked with the new or changed passwords 39A/39B. In the alternative, if hardware resets do not take place upon saving and exiting the security setup utility 34, the routine 200 continues from operation 224 to operation 226. Operation 226 determines whether the user wants the data storage devices 38A/38B locked with the new or changed passwords. If the devices are to be locked the routine 200 continues to operation 230 where power is removed from the devices to lock the devices with the new or changed passwords. Upon cycling power the routine 200 terminates at operation 231. If the devices are not to be locked, the routine 200 continues from operation 226 and terminates at operation 231.

Returning to operation 206, if the security password has already been set for the device, the routine 200 continues to operation 208 shown on FIG. 2C. Operation 208 prompts the user for a current security password. Upon a security password being entered, the routine 200 continues to operation 210 where the password is received and is used in an attempt to disable security for the data storage device 38A. Next the routine 200 continues to operation 213 where a determination of password validity is made. If the entry does not permit disabling the device 38A, it is invalid as a security password and the routine 200 continues to operation 214.

Operation 214 determines whether the password entry attempts have expired. If the attempts have not expired the routine 200 returns to operation 208 described above. If the entry attempts have expired, the routine 200 continues to operation 216 where a determination is made as to whether another drive has been selected for password manipulation. If another drive has not been selected, the routine 200 continues to operation 223 described above. If another drive has been selected, the routine 200 returns to operation 204 described above. In the alternative, entry of a security password to access security functionality may not be required. Utilizing, this alternative will give a user access to the security functions of any unlocked drive that supports the security feature set.

Referring back to operation 213, if the security password disables security for the selected device 38A, the routine 200 continues to operation 232 where the device is re-enabled. Next the routine 200 continues from operation 232 to operation 234 where a determination is made as to whether the clear or disable security password function (not shown) was selected. If the disable password function has been selected, the routine 200 continues to operation 236 where the security password is cleared and the security for the selected device is disabled. The routine 200 then continues to operation 216 described above.

If the disable password function has not been selected, the routine 200 continues to operation 238 where a determination is made as to whether the change password function (not shown) has been selected. If the change security password function has been selected, the routine 200 continues to operation 240 where a user is prompted to enter a new security password. Upon entry of the password, the routine 200 continues to operation 241 where the new password is received an enabled. Enabling is accomplished by writing the new security password to the firmware 37A of the data storage device 38A. The routine 200 then continues to operation 216 described above. If the change password function has not been selected, the routine 200 continues to operation 242 where a determination is made as to whether backup password changes are operative. This is an alternative feature that may be included in the implementation of device security.

If backup password changes are not operative, the routine 200 continues to operation 222 described above. If backup password changes are operative, the routine 200 continues to operation 244. Operation 244 makes a determination as to whether a backup password change function (not shown) has been selected. If the backup password change function has been selected, the routine 200 continues to operation 246 where a user is prompted for a new backup password. Upon entry of the new backup password, the routine 200 continues to operation 247 where the new password is received an enabled. Enabling is accomplished, for instance, by writing the new backup password to the firmware 37A of the data storage device 38A. The routine 200 then continues to operation 222 described above. If the optional backup password change function has not been selected the routine 200 continues from operation 244 to operation 222. It should be appreciated that the individual security functions may be implemented in a routine in conjunction with the other security functions or separately.

Figure 3:
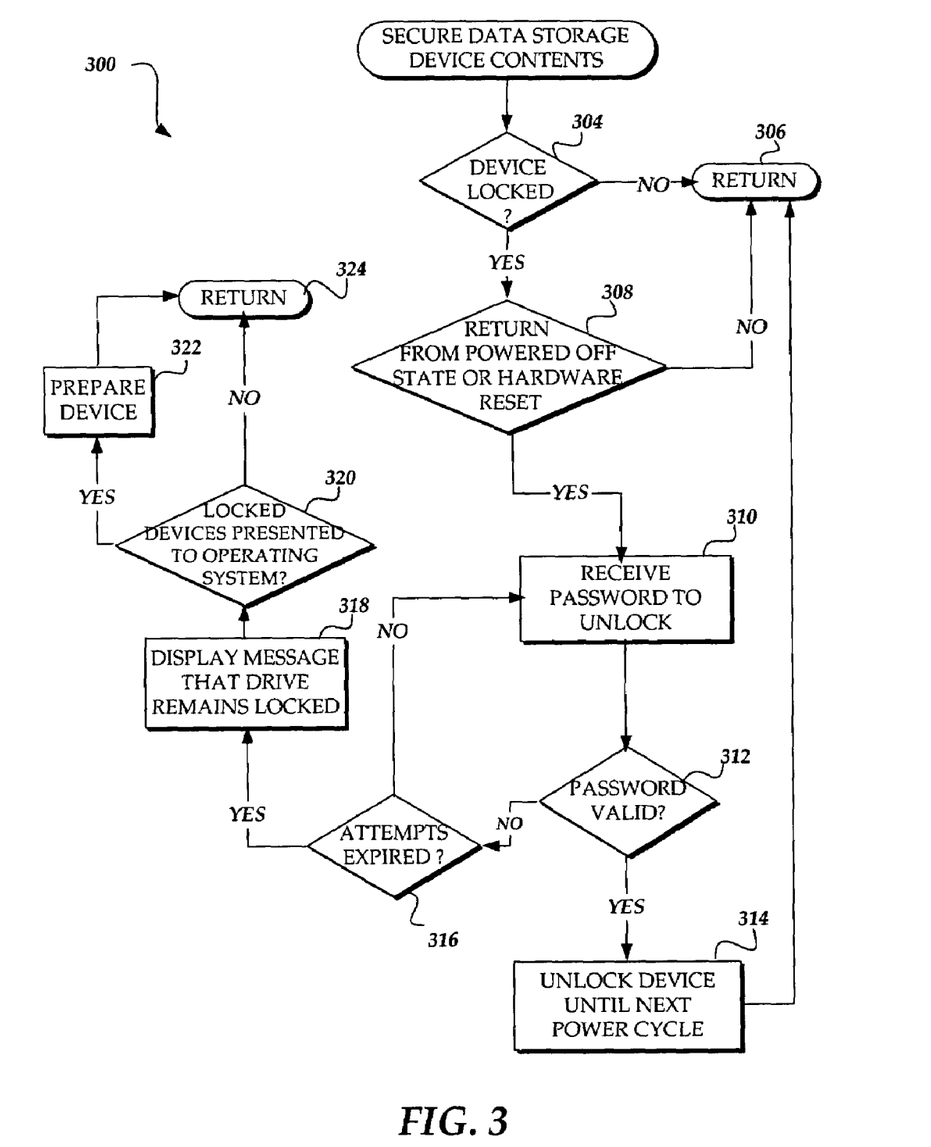
FIG. 3 illustrates an operational flow for securing the contents of data storage devices utilizing features provided in an embodiment of the invention.

Referring now to FIG. 3, an operational flow for securing the contents of data storage devices provided in an embodiment of the invention will be described. Once data storage device security has been enabled as described with regard to FIGS. 2A-2C, the routine 300 begins at operation 304. Operation 304 determines whether the data storage device is locked. This may accomplished by reading identifiers associated with the data storage device during a power on test procedure. The identifiers show whether the device supports the standard security features and whether the device is locked. If the device has not been locked, control returns to other routines at operation 306. If the device has been locked, the routine 300 continues to operation 308.

Operation 308 determines whether the data storage device is returning from a powered off state or a hardware reset. If the device is not returning from a powered off state or the optional hardware reset, control returns to other routines at operation 306. If the device is returning from a powered off state or a hardware reset, the routine 300 continues to operation 310 where a password is received from a user to unlock the device 38A. Upon receiving an entry, the routine 300 continues from operation 310 to operation 312 where a determination is made as to whether the entry matches the security password stored on the firmware 37A of the data storage device 38A. If the entry matches the security password, the device is unlocked at operation 314. The routine 300 then continues from operation 314 to return control to other routines at operation 306.

If the entry does not match the security password, the routine 300 continues to operation 316, where a determination is made as to whether a predetermined number of entry attempts have expired. If the entry attempts have not expired, the routine 300 returns to operation 310 described above. If the entry attempts have expired, the routine 300 continues to operation 318 where a message is displayed that the device remains locked. The routine 300 then continues from operation 318 to operation 320 where a determination is made as to whether locked devices are presented the operating system 40 for limited access. If locked devices are presented to the operating system 40, the routine 300 continues to operation 322 where the device is prepared for presentation to the operating system 40. This may be accomplished by setting a logic bit such that the device is not excluded during device verification detection during a power on test procedure. The routine then terminates at operation 324. In the alternative, if the locked devices are not presented to the operating system 40, the routine 300 will proceed from operation 320 to return control to other routines at operation 324.

Turning now to FIGS. 4A-4D an operational flow for securing the contents of data storage devices or drives according to an embodiment of the invention will be described. The routine 400 occurs during a power on test procedure and begins at operation 404 where a determination is made as to whether a data storage device is locked. This may be accomplished by reading the data storage device buffer for Identify Device information or by reading system memory after returning from a sleep state. The Identify Device information shows whether the disk drive supports the security features and whether the drive is locked. If returning from a sleep state where the storage device loses power, the system memory will have register bits set to indicate whether a valid password has been saved thereby indicating the data storage device is locked.

Figure 4A:
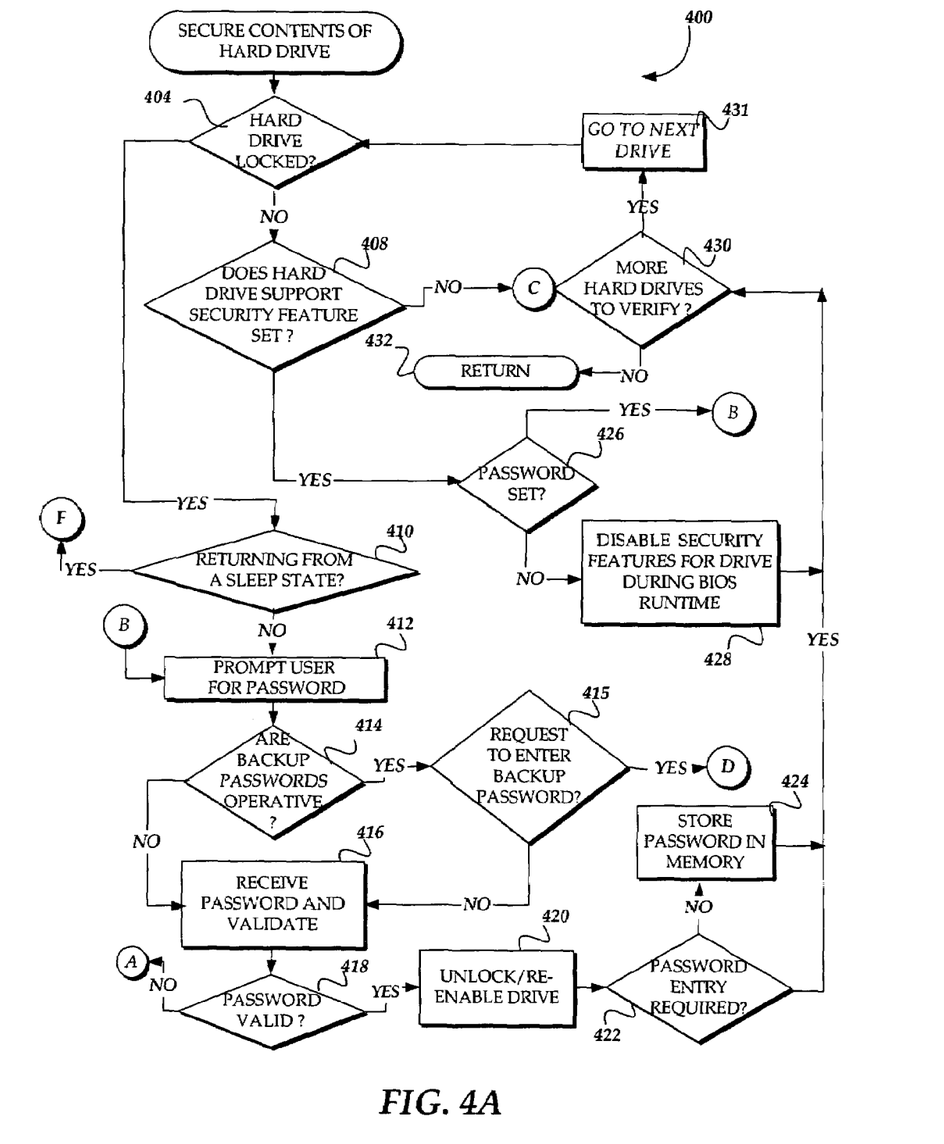
FIGS. 4A-4D illustrate an operational flow for securing the contents of data storage devices utilizing features according to another embodiment of the invention.

If the drive is locked, the routine 400 continues to operation 410 described below. If the drive is not locked, the routine 400 continues to operation 408 where a determination is made as to whether the drive supports the security features. If the drive does not support the security features, the routine 400 continues to operation 430 where a determination is made as to whether there are more drives to verify for security feature support. If there are more drives to verify, the routine 400 continues to operation 431 where a next hard drive is detected. Then, the routine 400 returns to operation 404 described above. If there are no more drives to verify, the routine 400 returns control to other routines at operation 432.

If the drive does support the security features, the routine 400 continues from operation 408 to operation 426 where a determination is made as to whether a password has been set or enabled for the drive. If a password has been set, the routine continues to operation 412 described below. If a password has not been set, the routine 400 continues to operation 428 where the security features that set or enable passwords are disabled during the BIOS runtime. This operation prevents a system or virus attack from setting passwords without authorization on drives that are unlocked and without a set password. The routine 400 then continues to operation 430 described above.

As described briefly above, if the drive is locked, the routine 400 continues from operation 404 to operation 410 where a determination is made as to whether the drive is returning from a sleep state. Operating systems that support the Advanced Configuration and Power Interface (ACPI) specification, such as MICROSOFT WINDOWS XP, by Microsoft Corporation of Redmond, Wash., may utilize a sleep state to conserve power. The sleep state powers down most devices on the motherboard, including the hard disk and hard disk controller. Additional information regarding implementation of drive security when a drive is returning from a sleep state will be described below with respect to FIG. 4D. It should be appreciated that in other embodiments of the present invention, sleep state functionality may be executed separately from other security functionalities.

If a drive is not returning from a sleep state, the routine 400 continues to operation 412 where a prompt for a security password is displayed. Upon receiving an entry, the routine 400 continues to operation 414 where a determination is made as to whether backup passwords are supported. Backup passwords are supported to unlock locked drives, however drives that are unlocked cannot have security disabled by a backup password. If backup passwords are supported and the drive is locked, the routine 400 continues to operation 415 where a determination is made as to whether the entry was a request to enter a backup password. For instance, the enter key may have been pressed at the prompt without entering a password. The empty entry may suffice as a request to enter a backup password instead of a security or user password. Additional details regarding the servicing of a request to enter a backup password will be described below with regard to FIG. 4C.

If the entry was not a request to enter a backup password, the routine 400 continues to operation 416 where the security password entry is received and used in an attempt to unlock the drive if the drive is locked or disable the security of the drive if the drive is unlocked. Next the routine 400 continues to operation 418 where a determination is made as to whether the drive is unlocked or the security is disabled, thereby indicating a valid password entry. If the password is invalid, the routine 400 continues from operation 418 to operation 436 illustrated in FIG. 4B. If the password is valid, the routine 400 continues to operation 420 where the drive is unlocked or the password is re-enabled.

Next the routine 400 continues to operation 422 where a determination is made as to whether sleep state returning drives require a user to enter a password to unlock the drive. If password entry from a user is not required, the routine 400 continues to operation 424 where the security password is stored in a non-volatile memory 35, located outside the hard drive, for retrieval without password entry from a user upon returning from a sleep state. The security password may be stored in the non-volatile memory 35 in an encrypted format. In the alternative, the security password may be stored in another area of the system memory 24, for example in RAM 26. The routine 400 then continues from operation 424 to operation 430 described above. If password entry from a user is required, the routine 400 continues from operation 422 to operation 430 described above.

Figure 4B:
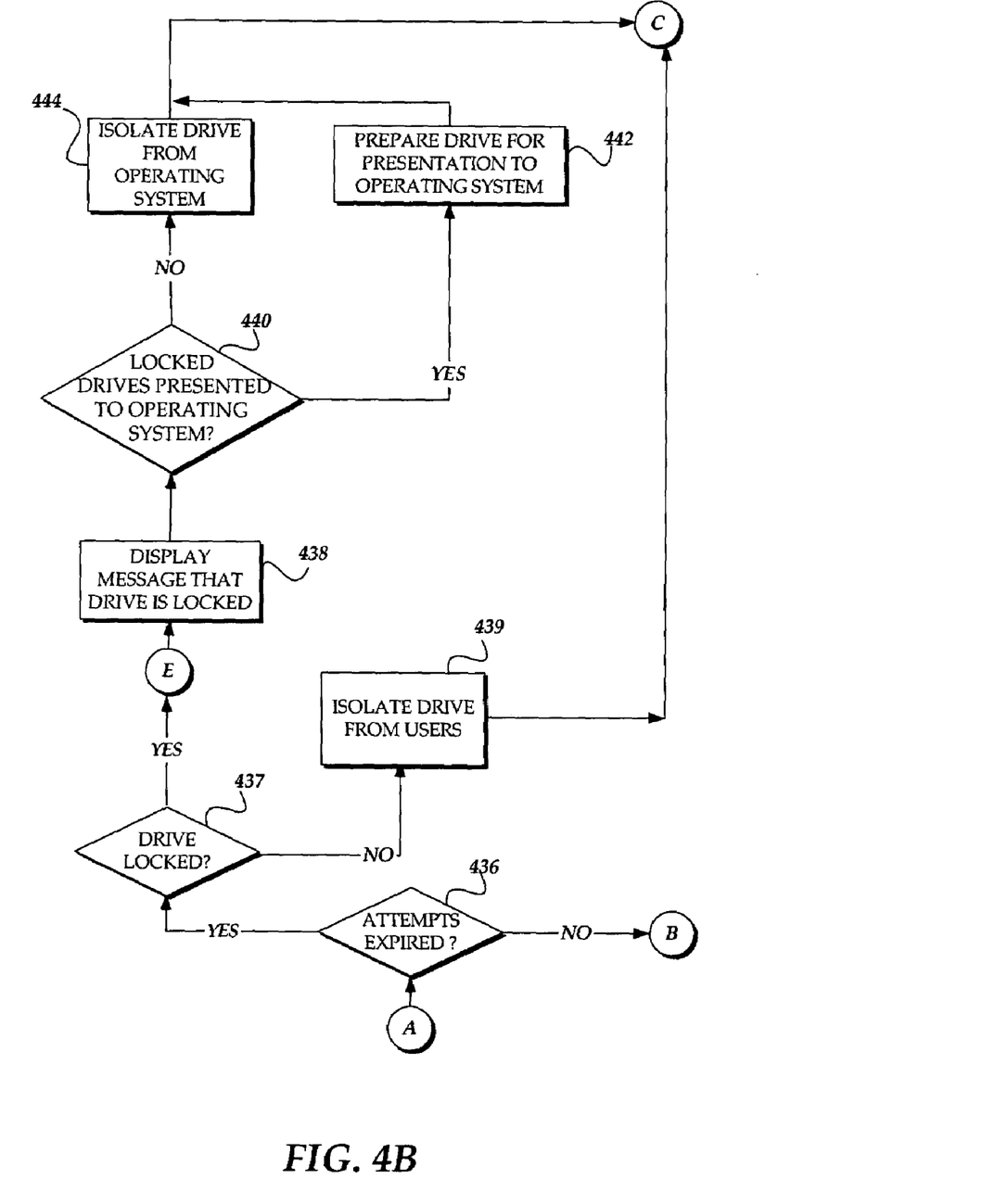

Turning now to FIG. 4B, operation 436 determines whether the security password entry attempts have expired. If the entry attempts have not expired, the routine 400 returns to operation 412 described above in FIG. 4A. The predetermined number of entry attempts may be decremented by a counter each time an invalid entry is entered until the counter equals zero, thereby indicating expiration of the entry attempts. If the entry attempts have expired, the routine 400 continues to operation 437 where a determination is made as to whether the drive is locked or unlocked. If the drive is not locked, the routine 400 continues to operation 439, where the unlocked drive, not receiving a valid security password, is disabled and isolated from users. The drive is isolated to keep unauthorized users from accessing an unlocked drive without authorization. The routine 400 then returns from operation 439 to operation 430 described above.

If at operation 437, the drive is determined locked, the routine 400 continues to operation 438 where a message is displayed that the drive remains locked due to invalid password entry. Next the routine 400 may continue to operation 440 where a determination is made as to whether locked drives are presented to the operating system 40 for limited access. If locked drives are presented to the operating system, the routine 400 continues to operation 442 where the drive is prepared for presentation to the operating system 40 for limited access. Preparation may include setting a bit to exclude the drive from detection verification during a power on test procedure. Detection verification would prevent a locked drive from being presented to the operating system 40. The routine 400 then returns to operation 430 described above in FIG. 4A. In the alternative, if locked drives are not presented to the operating system, the routine 400 continues from operation 440 to operation 444 where the locked drive is isolated from the operating system. The routine 400 then continues to operation 430 described above.

Figure 4C:
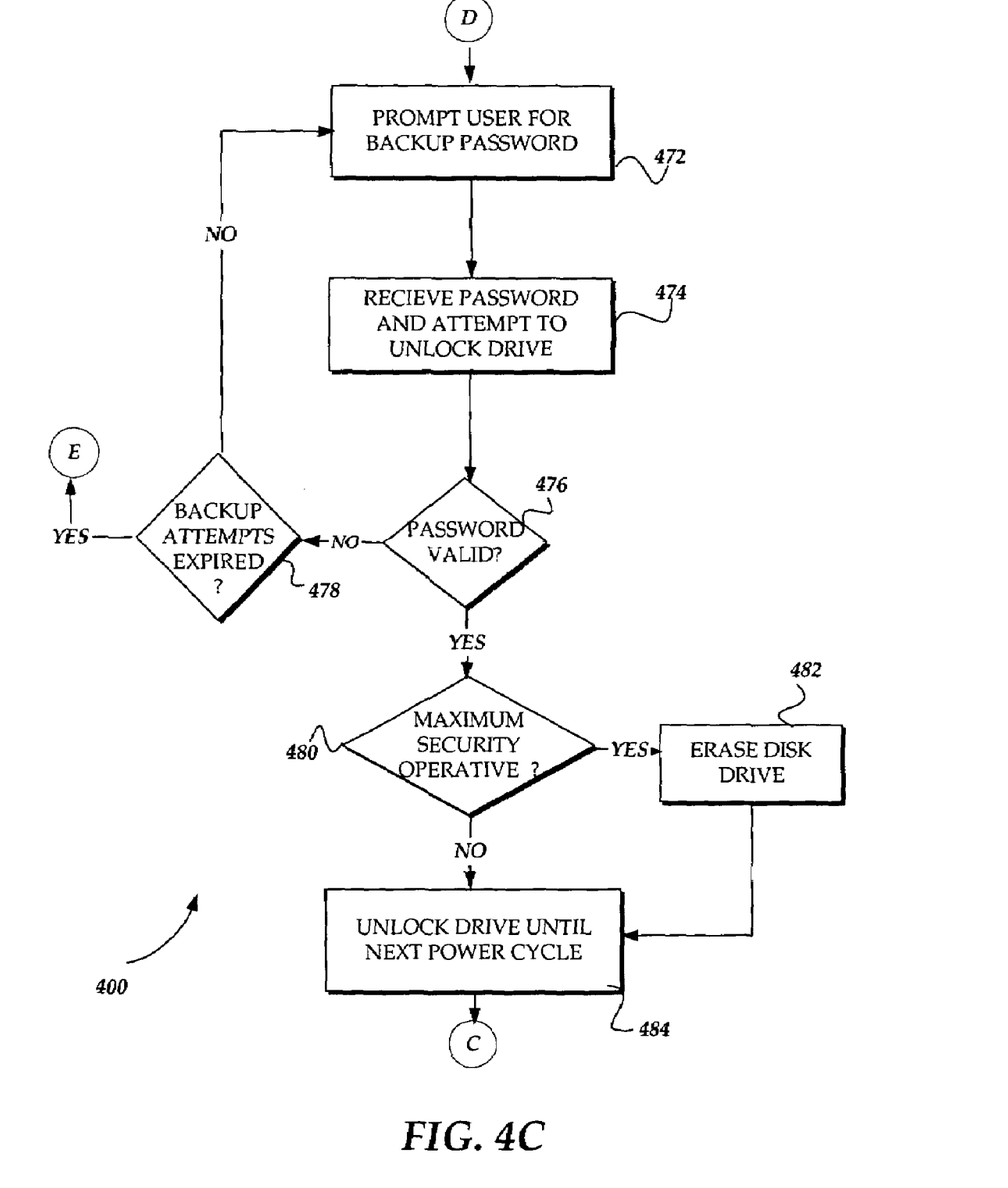

Referring now to FIG. 4C, if a request to enter a backup password is detected, the routine 400 continues from operation 415 to operation 472 where a backup password prompt is displayed. This backup password may have been set by an OEM or by the user in the setup utility 33. Backup passwords may be used to unlock the drive but not to make changes in the setup utility 33 as described in FIGS. 2A-2C. Upon entry of a password, the routine 400 continues to operation 474 where the password is received and used in an attempt to unlock the drive. Next the routine 400 continues to operation 476 where a determination is made as to whether the drive actually unlocked, making the entered password a match to the backup password. If the password is invalid, the routine 400 continues to operation 478 where a determination is made as to whether the backup password entry attempts have expired. If the backup password entry attempts have not expired the routine 400 returns to operation 472 described above. If the entry attempts have expired the routine 400 continues to operation 438 described above in FIG. 4B.

If the password is valid, the routine 400 continues from operation 476 to optional operation 480 where a determination is made as to whether maximum security is operative or supported. If maximum security is operative, the routine 400 continues to operation 482 where the disk drive is erased because the backup password was used to unlock the drive. ATA/ATAPI-5 requires issuing of the erase prepare and the erase security feature commands when erasing of the drive. Next the routine 400 continues to operation 484 where the drive is unlocked. If maximum security is not operative, the routine 400 continues from operation 480 to operation 484 described above. However, in this case the drive is not erased. The routine 400 then continues from operation 484 to operation 430 described above in FIG. 4A.

Figure 4D:
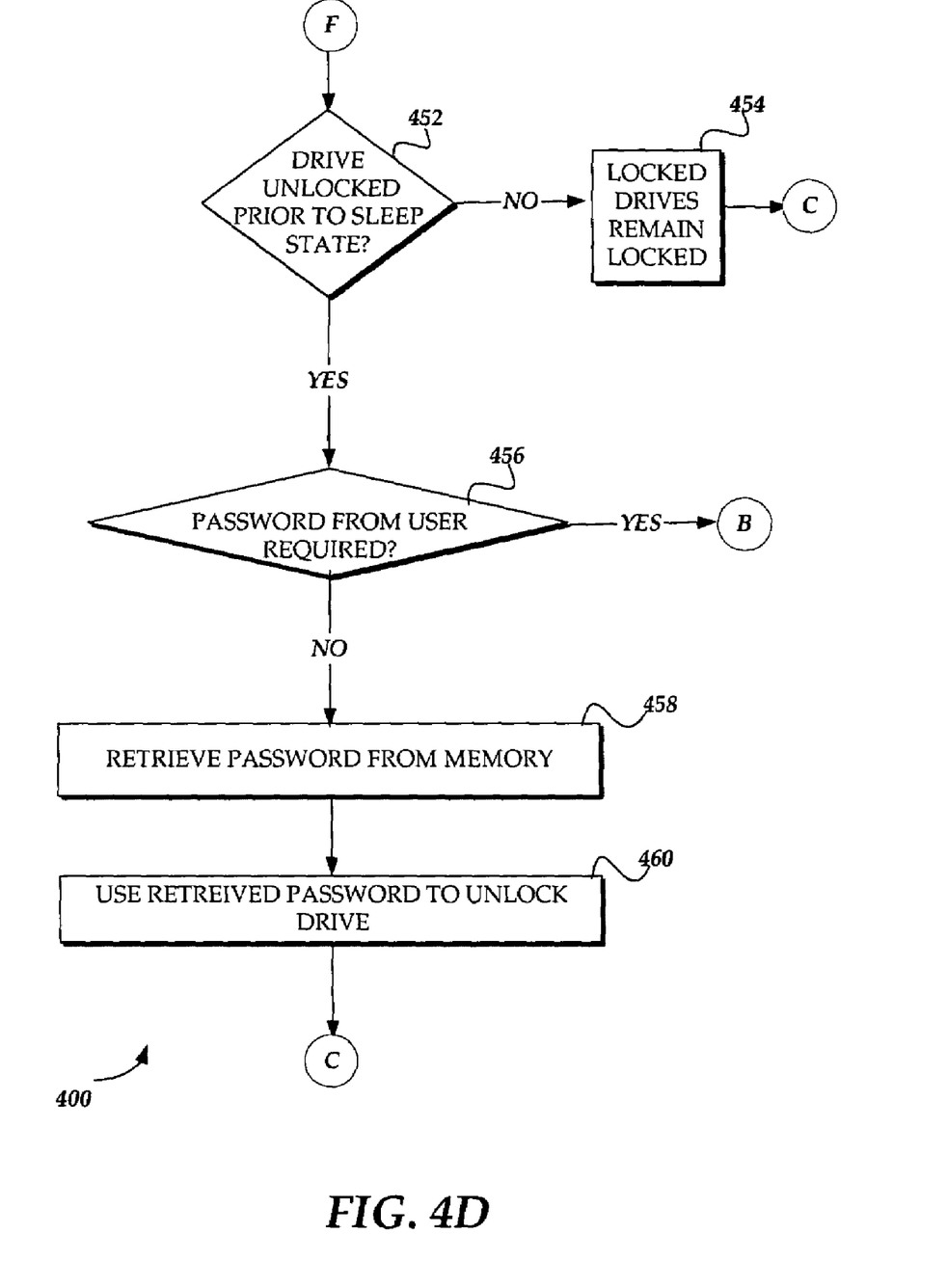

Turning now to FIG. 4D, if the drive is returning from a sleep state, the routine 400 continues from operation 410 to operation 452. Operation 452 determines whether the drive was unlocked prior to the sleep state occurring. This may be accomplished by checking a register bit for the drive in system memory. The system memory 24 remains powered when the drive loses power during a sleep state. If the drive was unlocked prior to the sleep state occurring, the register bit will indicate that a valid password was saved for the drive, thereby indicating that the drive was unlocked prior to the sleep state. If the drive was not unlocked prior to the sleep state, the routine 400 continues to operation 454 where if the drive was locked prior to the sleep state, then the drive remains locked. The routine then continues from operation 454 to operation 430 described above.

If the drive was unlocked prior to the sleep state, the routine 400 continues from operation 452 to operation 456 where a determination is made as to whether password entry from a user is required to unlock a drive returning from a sleep state. If entry from a user is required, the routine 400 returns to operation 412 described above in FIG. 4A. If entry from a user is not required, the routine 400 continues to operation 458 where the security password set for the drive, and stored during operation 424 described above, is retrieved from the non-volatile memory 35. In the alternative the security password may be retrieved from another area in the system memory 24, such as from RAM 26. Next the routine 400 continues to operation 460 where the retrieved security password is used to unlock the disk drive. The routine 400 then returns to operation 430 described above.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for securing contents of one or more data storage devices within a computer capable of storing a security password for unlocking and locking the data storage devices and of supporting one or more security features, the method comprising:
    reading from each of the data storage devices within the computer a data storage device identifier, the data storage device identifier indicating whether the data storage device supports the security features and whether the data storage device is locked or unlocked;
    determining from the data storage device identifier whether the data storage device supports the security features and is locked;
    in response to determining that the data storage device supports the security features and is locked, determining whether the data storage device is returning from a powered off state, a hardware reset, or a sleep state;
    in response to the data storage device being locked and returning from a powered off state or a hardware reset, determining whether a backup password may be used to unlock the data storage device;
    in response to determining that a backup password may be used, determining whether a request to enter a backup password has been received;
    in response to receiving a request to enter a backup password, receiving from a user the backup password for unlocking the data storage device and unlocking the data storage device, allowing access to data stored on the data storage device;
    in response to determining that the data storage device is locked and returning from a powered off state or a hardware reset and that the backup password may not be used or a request to enter the backup password has not been received, receiving from the user a password for unlocking the data storage device;
    in response to receiving the password, determining whether the received password is the security password;
    in response to the received password being the security password, unlocking the data storage device and thereby allowing access to data stored on the data storage device;
    in response to determining that the data storage device is locked and returning from a sleep state, determining whether the data storage device was unlocked prior to the sleep state; and
    in response to determining that the data storage device was unlocked prior to the sleep state, retrieving the security password from the memory and utilizing the security password to unlock the data storage device.

2. The method of claim 1, wherein the method is implemented during a power on test procedure of the computer hosting the data storage devices.

3. The method of claim 1, further comprising:
    in response to the received password not being the security password, determining whether limited access should be provided to each locked data storage device;
    in response to determining that limited access should be provided, setting a bit corresponding to each locked data storage device to exclude the locked data storage device from detection verification during a power on test procedure; and
    in response to determining that limited access should not be provided to each locked data storage device, isolating each locked data storage device from the operating system.

4. The method of claim 3, wherein limited access comprises prohibiting reading from or writing to the locked data storage device.

5. The method of claim 1, wherein the data storage devices are locked upon experiencing a powered off state, a sleep state, or a hardware reset, and wherein the method further comprises:
    in response to the received password being the security password, determining whether a data storage device returning from a sleep state should be unlocked without requiring a user to enter a password; and
    in response to determining that the data storage device should be unlocked without requiring a user to enter a password, storing the security password within a memory located outside the data storage device.

6. The method of claim 1, wherein the security password is stored within the memory in an encrypted format.

7. The method of claim 1, further comprising:
in response to determining that the data storage device is unlocked, determining whether a security password has been enabled; and
in response to determining that the data storage device is unlocked and that no security password is enabled for the data storage device, disabling, until a next power cycle, the security features that enable security passwords.

8. The method of claim 1, further comprising:
in response to the received password being the backup password, determining whether a maximum security is supported by the security features; and
in response to the received password being the backup password and the maximum security being supported, erasing the data storage device before unlocking the data storage device.

9. The method of claim 1, wherein a password entry attempt counter is set for a maximum number of entry attempts allowed, further comprising:
in response to determining that the password is not the security password, determining whether the password entry attempt counter is equal to zero;
in response to the password entry attempt counter being greater than zero, decrementing the password entry attempt counter by one and again receiving a password from a user; and
in response to the password entry attempt counter equaling zero, prohibiting additional password entries until a next power cycle and displaying a message that the data storage device remains locked.

10. The method of claim 1, further comprising executing a setup utility within the basic input/output system operative to control one or more functions for manipulating at least one of a security password and a backup password for a data storage device supporting the security features wherein the functions are accessed by one of entering the security password when prompted by the setup utility and selecting the data storage device in the setup utility when said data storage device is unlocked.

11. A computer storage medium comprising computer executable instructions which, when executed by a computer, cause the computer to:
read from each of the data storage devices within the computer a data storage device identifier, the data storage device identifier indicating whether the data storage device supports the security features and whether the data storage device is locked or unlocked;
determine from the data storage device identifier whether the data storage device supports the security features and is locked;
in response to determining that the data storage device supports the security features and is locked, determine whether the data storage device is returning from a powered off state, a hardware reset, or a sleep state;
in response to the data storage device being locked and returning from a powered off state or a hardware reset, determine whether a backup password may be used to unlock the data storage device;
in response to determining that a backup password may be used, determine whether a request to enter a backup password has been received;
in response to receiving a request to enter a backup password, receive from a user the backup password for unlocking the data storage device and unlock the data storage device, allowing access to data stored on the data storage device;
in response to determining that the data storage device is locked and returning from a powered off state or a hardware reset and that the backup password may not be used or a request to enter the backup password has not been received, receive from the user a password for unlocking the data storage device;
in response to receiving the password, determine whether the received password is the security password;
in response to the received password being the security password, unlock the data storage device allowing access to data stored on the data storage device;
in response to determining that the data storage device is locked and returning from a sleep state, determine whether the data storage device was unlocked prior to the sleep state; and
in response to determining that the data storage device was unlocked prior to the sleep state, retrieve the security password from the memory and utilize the security password to unlock the data storage device.

* * * * *